Nov. 18, 1958

K. C. ALLEN ET AL 2,860,867

COMPUTING SCALE

Filed Aug. 24, 1953

INVENTOR.
KENNETH C. ALLEN &
BY LAWRENCE B. BIEBEL

ATTORNEYS

Nov. 18, 1958  K. C. ALLEN ET AL  2,860,867
COMPUTING SCALE

Filed Aug. 24, 1953  2 Sheets-Sheet 2

INVENTORS
KENNETH C. ALLEN &
BY LAWRENCE B. BIEBEL

ATTORNEYS

United States Patent Office 2,860,867
Patented Nov. 18, 1958

2,860,867
COMPUTING SCALE

Kenneth C. Allen and Lawrence B. Biebel, Dayton, Ohio, assignors to The Hobart Manufacturing Company, Troy, Ohio, a corporation of Ohio Application August 24, 1953, Serial No. 376,135

16 Claims. (Cl. 265—29)

This invention relates to weighing scales and more particularly to computing scales.

It is one of the objects of the invention to provide a scale for weighing a series of articles rapidly and accurately, providing an indication and record of the transaction, and preventing the possibility of repeat or multiple weighings of the same article.

It is a further object to provide a scale suitable for weighing prepackaged articles and the like where a series of articles are to be weighed rapidly, and producing printed tickets for each article showing the weight, unit price, and total value.

It is a further object to provide a scale in which a recording of the weight of the article is made as soon as the scale comes to a balance, following which the weight and value of the article at a particular unit price are determined and a ticket printed, leaving the scale free meanwhile to enable the weighed article to be removed and a new article placed in weighing position thereon to speed up the operation.

Other objects and advantages will be apparent from the following description, the accompanying drawings and the appended claims.

Figure 1:
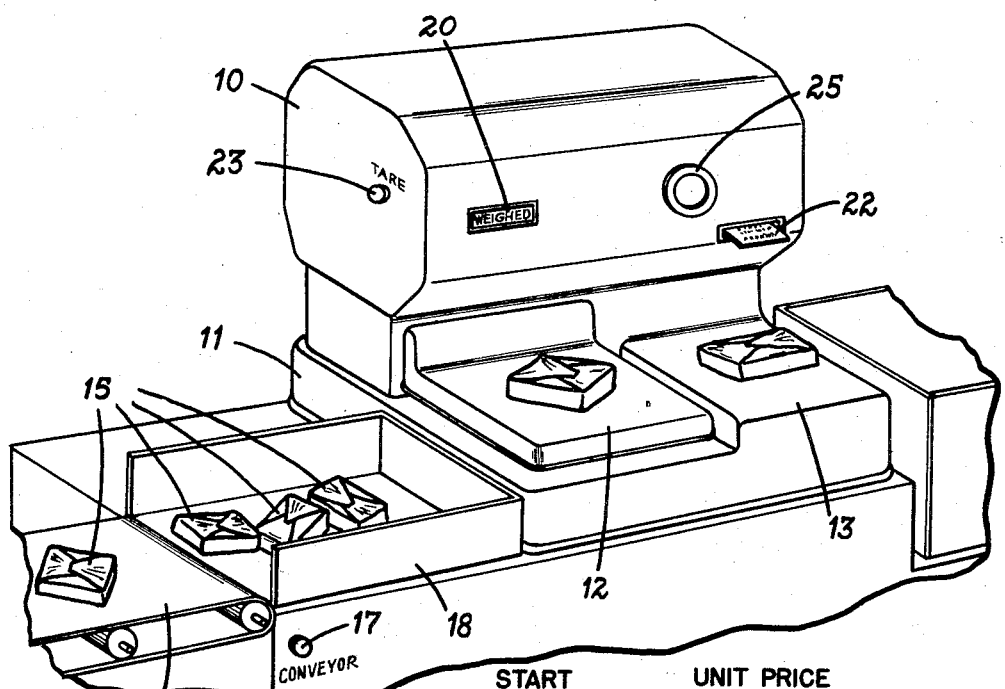
Fig. 1 is a view in perspective showing an embodiment of the invention arranged for handling prepackaged articles.

Referring to the drawings which disclose a preferred embodiment of the mechanism a housing is shown at 10 enclosing the weighing, computing and ticket printing mechanism, the housing being mounted on a base 11 which supports the platter 12. The base is formed with an upwardly extending portion 13 at the side of the platter, and preferably at about the same elevation, to facilitate the sliding of the articles as they are weighed from the platter on to this support. While not so limited, the scale is adapted for use with prepackaged articles, a number of which are indicated at 15 as being delivered on conveyor 16, controlled by the manual push button 17, into a receiving receptacle 18. In use, the operator takes an article out of the receptacle 18, places it on the platter 12, and as soon as it has been weighed, a suitable designation to that effect appears at window 20, following which the article can be transferred to the support 13, to await the delivery of printed ticket 22 containing a record of the transaction, the ticket then being placed on the corresponding article, so that a series of such transactions can be carried out rapidly and with a minimum of handling and manipulation. The scale also preferably has an adjustable tare device 23 which is set by the operator in accordance with the tare weight of each individually different package. A further manual control 25 easily accessible on the front of the scale is provided by means of which the unit price may be selected, from which it is obvious that this control may be readily adjusted for each different type of article having a different unit price without delaying the operation as a whole. It will further be noted that the customary chart for reading weight and value is eliminated, and the entire record of the transaction appears upon the printed ticket.

Figure 2:
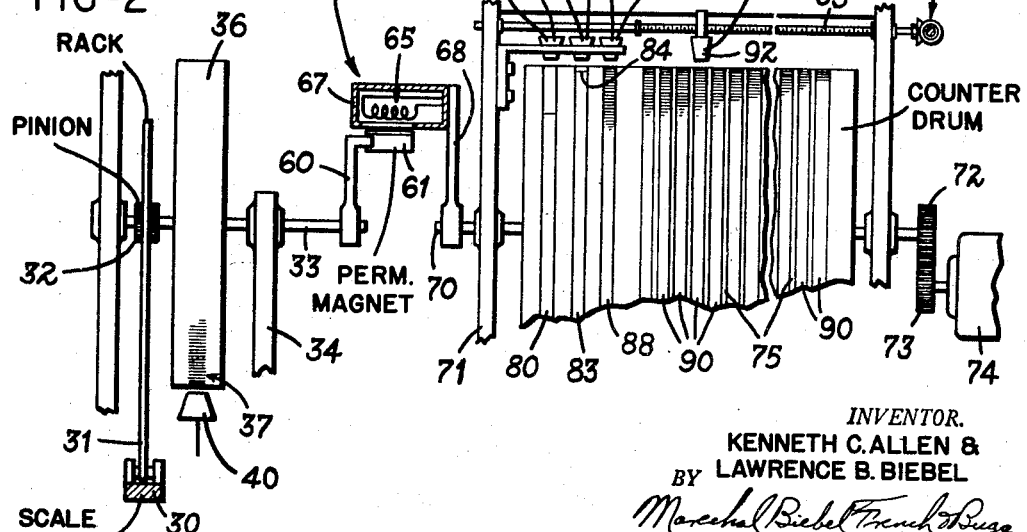
Fig. 2 is a view of the weighing, recording and computing mechanism of the invention.
Figure 3:
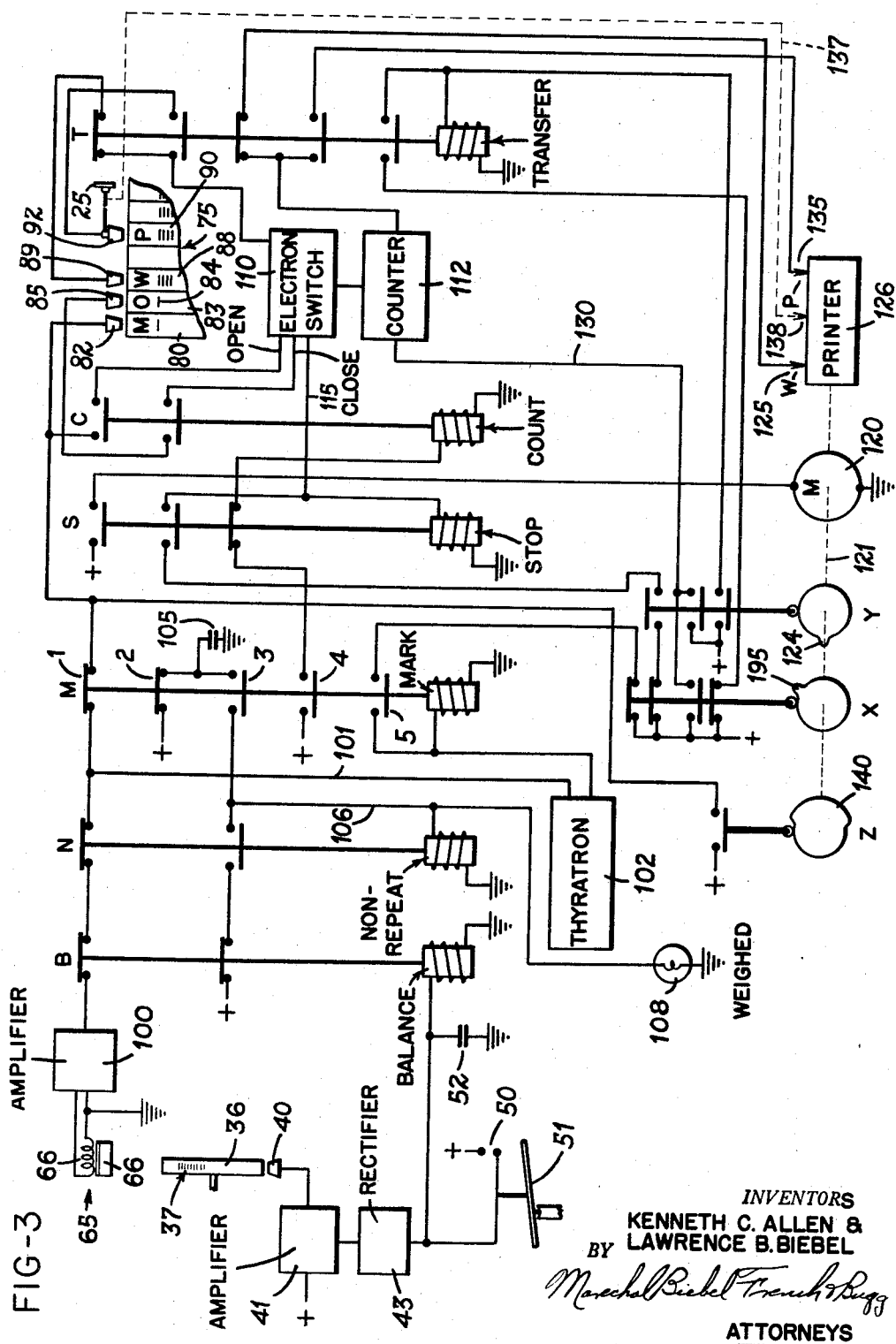
Fig. 3 is a schematic view showing the circuit arrangements.

The mechanism by which this is accomplished is shown in Fig. 2 and the control circuits therefor in Fig. 3. Referring to Fig. 2, the scale lever is shown at 30, the scale having suitable weighing mechanism incorporating either a counterbalance or a spring as desired, providing for a deflection of the lever in direct relation to the weight of the article. As the lever is moved in this manner it actuates rack 31 to cause rotation of pinion 32 on shaft 33 suitably supported by bracket 34 within the housing 10.

Fastened to shaft 33 is a means for sensing when the scale comes to a position of rest. A suitable arrangement for this purpose embodies drum 36 having a series of magnetically recorded pulses 37. A magnetic pickup head 40 is located adjacent the periphery of the drum, and through an amplifier 41 and a rectifier 43 (Fig. 3), energizes the coil of a balance relay marked B. A parallel circuit for energizing balance relay B is established from the power source through switch contacts 50 which are connected with the main lever 51 of the scale and so arranged that they are closed when the lever occupies its no load position, but remain open whenever the lever is deflected away from that position. A condenser 52 is connected in shunt circuit with the operating coil of relay B and is so arranged that it will provide a slight delay, of the order of a fraction of a second, in the opening or release of that relay upon its deenergization.

It will be clear from the above that when there is no load on the scale, contacts 50 will be closed and balance relay B will remain in energized and hence operated position. When a load is placed on the scale switch 50 opens, but at the same time the drum 36 rotates carrying the magnetic pulses 37 past the pickup head 40 with the result that a voltage is generated in the amplifier 41, rectified at 43, and supplied to the operating coil of relay B to maintain the same in energized condition. When the scale reaches its balance point, further travel of drum 36 ceases, and there is no longer any supply of electrical energy to maintain the coil of the relay energized. There is a charge on condenser 52 however by reason of the previous supply of energy thereto, and the relay thus remains in energized condition for a brief interval to assure that the scale has come to a full rest position. Thereupon the relay releases, dropping its contact arms to their back or closed circuit positions as shown in the diagram.

Shaft 33 likewise carries an arm 60 to which is attached a permanent magnet 61 which is thus shifted circumferentially around the axis of shaft 33 through an angular displacement corresponding to the weight of the article. A sensing unit 65 in the form of a pickup coil 66 carried in housing 67 is supported by bracket 68 on shaft 70 which is journaled in frame 71 and which at its opposite end carries pinion 72 in mesh with gear 73 driven by constantly running motor 74. A counter drum 75 having a series of tracks thereon is also mounted on and rotatable with shaft 70. These tracks include a memory track 80 arranged to cooperate with a recording, pickup, and erasing head 82 mounted in fixed position on frame 71. Another one of the tracks is shown at 83 and is arranged with a single marker pulse 84 thereon which cooperates with a pickup head 85 similarly carried in fixed relation on the frame. Another track 88 has a series of weight graduations thereon corresponding to small increments of weight, such as hundredths of a pound, and is arranged for cooperation with magnetic pickup head 89 carried on the fixed support.

The remaining tracks 90 have graduations thereon in different spaced relation corresponding to value at different unit prices, each graduation representing one cent of total value. A single pickup head 92 is mounted for selective travel across the frame under the action of threaded rod 93, to bring the head into proper relation with a particular one of the tracks 90, to select one desired price per pound. Gearing 94 connects shaft 93 with hand control 25 on the outer face of the casing.

While the various tracks on the control drum are indicated as being magnetically recorded, for cooperation with the respective magnetic pickup, recording, and erasing heads, it will be understood that suitable optical or other pulse counting and recording mechanism may be used as desired. It will also be evident that with the constantly running motor 74, the counter drum turns continuously and preferably at a speed such as to make several revolutions per second of the rotating system, thereby bringing sensing unit 65 past the magnet 61 once during each revolution. When this occurs, an electrical pulse of energy is actuated in coil 66, and it is this pulse which is utilized to bring about the temporary recording of the weight factor on the memory drum, for subsequent use in the operation of the device. The position of the marker pulse 84 corresponds to the zero or datum line position of magnet 61 when there is no load on the scale, i. e., when it is in balance at zero load.

The several relays in this diagram are shown in their deenergized position, being adapted to lift their armatures and associated contact arms in response to deenergization. Also each respective relay contact or switch arm is numbered consecutively beginning with the topmost one, in accordance with the designations applied to mark relay M.

Assume now that a weight has been applied to the scale and that the scale has reached a balance point such that relay B is deenergized, closing its back contacts 1 and 2. A circuit is thereby established from magnetic pickup head 66, through amplifier 100, contacts B1, contacts N1, contacts M1 to the recording head 82. Accordingly when the sensing unit 65 next reaches the position occupied by arm 60 and magnet 61, a pulse is picked up, amplified, and transmitted to the recording head 82 where it is recorded on the memory track of the drum in an angular position corresponding to that occupied by arm 60 at that instant. It will be evident that the angular displacement of this mark from the datum line position is the same as the angular displacement through which the arm 60 and magnet have traveled from the no-load position of the scale, and hence the position of such mark on the drum is proportional to the weight of the article.

The same pulse travels through line 101 to an integrator 102 which may be in the nature of a thyratron tube adapted to produce a sustained flow of current of some brief duration in response to the tripping of its circuit by the pulse received from amplifier 100. In response to this flow of current mark relay M is energized and upon closing, completes a locking circuit for itself through its own contacts M5 and back contacts X1 of a cam switch X. At the same time the circuit from the sensing unit is broken at contacts M1 so that no additional recording on the memory drum can occur.

Likewise upon closing relay M opens a circuit through its contact M2 through which condenser 105 has been energized and closes its contact M3, allowing the condenser to discharge through the latter circuit which is connected to the operating coil of non-repeat relay N through line 106. A parallel circuit provides for illuminating a lamp 108 which is located within the housing of the scale in back of the sign 20, so that at this point the scale will show on its face that the article has been weighed, and thereafter the article can be removed if desired to allow the positioning of a second article on the weighing platform. Relay N upon closing locks itself in through its contact N2, and opens the circuit from the sensing unit at its contact N1, and as long as it remains energized it keeps the lamp 108 illuminated.

Relay M on closing likewise establishes an energizing circuit through its contact M4, through the closed contacts S3 of stop relay S to the operating coil of a count relay C. Relay C thereupon closes, and in doing so its contacts C2 complete a circuit from the pickup head 85 to the closing circuit of an electronic switch 110 which is adapted to be closed in response to the passage of a pulse thereto through such circuit. Contacts C1 complete a circuit from pickup head 82 to the opening circuit of the electronic switch, the switch being similarly adapted to open in response to the pulse being received through the latter circuit.

As rotation of the counter drum 75 continues the next time that marker pulse 84 passes under pickup head 85 the drum is oriented and occupies a precise and known position at that instant relative to the datum line position. The resulting pulse causes electronic switch 110 to close, and on closing it completes a through circuit from the weight pickup head 89, contacts T1 of transfer relay, and into the counter indicated at 112. For high speed counting operations an electronic counting device may be used operating on either a binary or a decimal system, while for operations where slower speed counting suffices, ordinary relay-type counting equipment may be provided.

As the weight graduations on the track 88 traverse the position of the pickup head 89, individual pulses are produced corresponding to each unit of weight, and these pulses are transmitted to and accumulated in counter 112. This operation continues until the recorded pulse on memory track 80 traverses pickup head 82, at which time a pulse is generated through the opening circuit of electronic switch 110, which thereupon opens and disconnects the pickup heads from the counter, leaving in the counter the count corresponding to the number of weight graduations counted up to that point. Likewise on opening, the electronic switch produces a pulse in circuit 115, this circuit being connected to the energizing coil of stop relay S, causing that relay to be energized, resulting in the closing of its contacts S2, thereby establishing a lock-in circuit through the contacts X1 and Y1 of the two cam switches X and Y respectively. Likewise on being energized relay S opens its contacts S3, thereby deenergizing relay C and disconnecting the circuit for closing electronic switch 110 so that the switch will not be actuated improperly in response to subsequent passages of the marker pulse 84 under its pickup head 85.

Relay S also closes its contacts S1 which supplies power to operate print motor 120, that motor rotating the printer and cam shaft 121 through approximately 90°. At this time a lobe 124 on cam Y momentarily lifts the switch arms on cam Y, opening contacts Y1 and thereby opening the lock-in circuit to relay S which drops out, with resultant opening of its own contacts S1, thereby deenergizing motor M. Meanwhile, however, the counter 112 has been connected through contacts T3 to the weight input 125 of the printer 126, and the count of the counter has been set into the printer with the result that the quarter revolution of printer shaft 121 has completed the setting of the wheels in the printer to properly designate the weight of the article.

Cam switch contacts Y2 upon closing have supplied power through line 130 to reset counter 112 back to its zero position in preparation for the counting of the price. Likewise contacts Y3 on closing supply an energizing circuit for the operating coil of transfer relay T. On closing, relay T completes a holding circuit for itself through its contacts T5 and contacts X4.

In response to its energization, relay T opens its contacts T1 and closes contacts T2, thereby connecting the price pickup head 92 to count price graduations into electronic switch 110. Likewise it opens its contacts T3 and closes its contacts T4, disconnecting counter 112 from the weight input of the printer and connecting it to the price input 135 of the printer.

Meanwhile the release of relay S has resulted in the closing of its contacts S3, thereby resetting the energizing circuit for operating relay C, from the power source, through contacts M4, and contacts S3. Relay C then closes, reestablishing the same pulse counting circuits as initially. The same sequence of operations therefore takes place except that instead of counting the weight pulses through pickup head 89, the system now counts the price pulses through pickup head 92, and supplies the count to the price input 135 of the printer.

When electronic switch 110 opens at the end of the price counting operation, relay S is again reenergized, locking itself in as before, and reenergizing the printing motor 120. Through the next quarter revolution of the printer shaft, the price printing wheels in the printer are properly set in accordance with the data supplied thereto, and the printer then continues through the remaining half revolution of its shaft during which time the actual printing of the ticket occurs through the movement of the platen against the type wheels, the printed ticket is cut off, ejected, etc.

Meanwhile price selector 25, in addition to shifting price pickup head 92 to the proper track, has, by suitable connections indicated at 137, set the unit price into the price input 138 of the printer, so that this data also appears on the printed ticket.

During the last half revolution a lobe 140 on cam Z, which as shown has a relatively wide face, closes contacts Z1 which supplies power for a substantial interval to the magnetic head 82, to effect erasing of the recorded mark on the memory track of the drum. The actual interval so involved need be only sufficient to insure that the erasing head will be energized during at least one full revolution of the counter drum. Lobe 140 releases its switch Z1 before the end of the cycle so that the erasing power supplied is removed in preparation for another weighing cycle.

Likewise as the end of the cycle is reached, lobe 195 on cam switch X momentarily raises all of the arms of such switch, thereby breaking the holding circuit for relay T at contacts X4, restoring that relay to its initial position where it will provide for picking up and transmitting the count of the weight graduations. Contacts X3 actuate the reset circuit for counter 112. The opening of contacts X2 breaks the holding circuit for relay S which thereupon releases, deenergizing the printer motor 120 at the end of its cycle. Finally, opening of contacts X1 breaks the holding circuit for relay M, which thereupon returns to its initial position. Relay N however remains energized if relay B remains unenergized, which will be the case provided the weighed article has not been removed from the scale. Under these conditions its contacts N1 are open, and thus the circuit from the sensing unit is broken and repetition of a weighing operation of the same article is prevented. If however during the cycle the weighed article has been removed, relay B will have been energized, thereby breaking the circuit from the sensing unit at contacts B1 and also breaking the holding circuit for relay N, resulting in extinguishing lamp 108. If during the counting and printing operation a second article is placed on the scale, resulting in the scale coming to rest at a new balance point then relay B will be deenergized and a new cycle of operation will take place immediately. If there is no article on the scale, it will merely stand by in condition to proceed as soon as a subsequent article has been so applied.

The invention thus provides a scale which is fully interlocked so that a repeat or chance operation cannot occur and in which the placing of an article on the platter results in the immediate recording of a marker corresponding in price to the weight of that article, which is followed by the actuation of a sign which indicates to the user that the weighing has been completed, and that article can then be removed and a fresh article placed in weighing position. Meanwhile the mechanism weighs and computes the value of the article and prints and delivers a ticket so that the ticket when delivered may be placed on the weighed package, thereby enabling the operator rapidly, reliably, and accurately to weigh and value an entire series of articles and apply printed tickets thereto.

Cross reference is made to copending application of Lawrence B. Biebel, Serial No. 300,403, filed July 23, 1952, now Patent Number 2,803,448, relating to similar subject matter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A computing scale having a load receiving platter, a lever, weighing mechanism associated therewith, an element adapted to be deflected in direct relation to the displacement of said lever upon application of a load to said platter, a memory device having a datum position, means for temporarily recording the amount of deflection of said element in predetermined relation to said datum position leaving the scale free for a subsequent weighing operation, means for thereafter measuring the weight by reference to the spacing of said recorded position on said memory device relative to said datum position, additional means for computing the value at a predetermined price by additional reference to the spacing of said positions on said memory device, and means operable thereafter for erasing said recorded position from said memory device.

2. A computing scale having a load receiving platter, a lever, weighing mechanism associated therewith, an element adapted to be deflected in direct relation to the deflection of said lever under load, a continuously rotating memory drum means for recording on said drum a position corresponding to the deflection of said scale lever, means establishing a datum position on said drum, means operable thereafter independently of the weighing mechanism and lever for measuring the weight by reference to said recorded position and said datum position on said drum leaving the scale free for a subsequent weighing operation, additional means for thereafter computing the value at a predetermined price per pound by additional reference to said spacing of said positions, and means for producing a record of the weight and value in accordance with said measurements.

3. A computing scale having a load receiving platter, a lever, a weighing mechanism associated therewith, an element adapted to be deflected through an angle varying in direct relation to the deflection of said lever, a continuously rotating counter drum, means operable for recording a pulse on a memory track of said drum at an angular position corresponding to the deflected position of said element, means on said drum establishing a datum line position, counting means associated with said drum for counting weight graduations at a predetermined rate, means controlled by said drum for initiating the action of said counter at said datum line position and terminating said action at said recorded position to produce a count representing the weight of the article, and means for indicating the completion of operation of said recorded means to free the scale for a subsequent weighing operation.

4. A computing scale having a load receiving platter, a lever, a weighing mechanism associated therewith, an element adapted to be deflected through an angle varying in direct relation to the deflection of said lever, a continuously rotating counter drum, means operable for recording a pulse on a memory track of said drum at an angular position corresponding to the deflected position of said element, means on said drum establishing a datum line position, counting means associated with said drum for counting weight graduations at a predetermined rate, means controlled by said memory drum for initiating the action of said counter at said datum line position and terminating said action at said recorded position to produce a count representing the weight of the article, and additional means controlled by said datum line position and by said recorded pulse for actuating said counter through the same angular extent of the rotation of said drum at a selected rate corresponding to the price per pound to produce a count in said counter representative of the value.

5. A computing scale having a load receiving platter, a lever, weighing mechanism associated with said lever, an arm adapted to be deflected from a zero position through an angle corresponding to the weight of an article, a continuously rotating drum, means rotatable with said drum for sensing the position of said arm, means for recording on said drum the position of said arm, weight and value graduations on said drum having a datum line position, counting means for separately counting the number of said weight and value graduations between said datum line position and said recorded position to afford separate counts of the weight and value of the article, and means controlled by said counting means providing a record of the weight and value of the article.

6. A comprising scale having a load receiving platter, a lever, weighing mechanism associated with said lever, an arm adapted to be deflected from a zero position through an angle corresponding to the weight of an article, a continuously rotating drum having a datum line position thereon, means rotatable with said drum for sensing the position of said arm, means for temporarily recording on said drum the position of said arm, weight and value graduations on said drum, counting means for separately counting the number of said weight and value graduations between said datum line position and said recorded position to afford a count of the weight and value of the article, means controlled by said counting means providing a record of the weight and value of the article, and means for disabling said recording means during the operation of said record producing means to allow application of a subsequent article to the scale without interfering with the completion of the record of said first transaction.

7. A computing scale having a lever, weighing mechanism associated therewith, an arm adapted to be deflected through an angle corresponding to the weight of the article, means responsive to the arrival of said lever at a balanced condition in a weighing operation, means controlled by said responsive means for effecting the recording of the angular position of said arm at said balanced condition, separate weight and value graduations arranged in an arcuate path corresponding to that traversed by said arm, each having a datum line position, means for separately counting said weight and value graduations, and means for initiating operation of said counting means for each of said separate counts at said datum line position and continuing said operation through said recorded angular position to provide counts corresponding respectively to the weight and value of the article weighed.

8. A computing scale having a lever, weighing mechanism associated therewith, an arm adapted to be deflected through an angle corresponding to the weight of the article, means responsive to the arrival of said lever at a balanced condition in a weighing operation, means controlled by said responsive means for effecting the recording of the angular position of said arm at said balanced condition, a series of weight graduations having a datum line position, a plurality of series of value graduations at different unit prices each having a datum line position, said graduations extending over a range corresponding to the travel of said arm, means for counting said graduations, means for initiating said counting means at said datum line position and terminating said action at said recorded position, and means for separately counting said weight graduations and said value graduations at a selected unit price.

9. A computing scale having a lever, weighing mechanism associated therewith, an arm adapted to be deflected through an angle corresponding to the weight of the article, means responsive to the arrival of said lever at a balanced condition in a weighing operation, means controlled by said responsive means for effecting the recording of the angular position of said arm at said balanced condition, a series of weight graduations, a plurality of series of value graduations at different unit prices, said graduations extending over a range corresponding to the travel of said arm, means for counting said graduations, means for initiating said counting means at a predetermined position corresponding to the no load position of said lever and terminating said action at said recorded position, means for separately counting said weight graduations and said value graduations at a selected unit price, and means for changing the unit price at which said value graduations are counted.

10. A computing scale having a lever, weighing mechanism associated therewith, an arm adapted to be deflected through an angle corresponding to the weight of the article, means responsive to the arrival of said lever at a balanced condition in a weighing operation, means controlled by said responsive means for effecting the recording of the angular position of said arm at said balanced condition, a series of weight graduations, a plurality of series of value graduations at different unit prices, said graduations extending over a range corresponding to the travel of said arm, means for counting said graduations, means for initiating said counting means at a predetermined position corresponding to the no load position of said lever and terminating said action at said recorded position, means for separately counting said weight graduations and said value graduations at a selected unit price, and means controlled by said counting means for providing a record of said weight and value.

11. A computing scale having a lever, weighing mechanism associated therewith, an arm connected to said lever and adapted to be deflected through an angle corresponding to the weight of the article, a continuously rotating counter drum, means rotatable with said drum and traversing a path adjacent that of said arm for sensing the angular position occupied by said arm, means responsive to the arrival of said lever at a balanced condition in a weighing operation, a memory track on said counter drum, means controlled by said responsive means for recording the angular position of said arm on said memory track after said lever has come to a balanced condition, a marker pulse occupying another track on said drum, a series of recorded pulses occupying a weight reading track on said drum and spaced in accordance with small increments of weight, a plurality of series recorded pulses occupying a series of value reading tracks on said drum spaced at different distances corresponding to different unit prices, means controlled by said marker pulse for initiating the counting of pulses from said weight track, means controlled by the position recorded on said memory track for terminating said counting operation, means controlled by said marker pulse for separately counting pulses from a selected one of said value tracks, means controlled by said recorded position on said memory track for terminating said counting operation, and means for producing a record of said respective counts indicating the weight and value of the article.

12. A computing scale having a lever, weighing mechanism associated therewith, an arm connected to said lever and adapted to be deflected through an angle corresponding to the weight of the article, a continuously rotating counter drum, means rotatable with said drum and traversing a path adjacent that of said arm for sensing the angular position occupied by said arm, means responsive to the arrival of said lever at a balanced condition in a weighing operation, a recording track on said counter drum, means controlled by said responsive means for recording the angular position of said arm on said track, a marker pulse occupying another track of said drum and identifying a datum line position, a series of graduated pulses occupying a weight reading track of said drum and spaced in accordance with small increments of weight, a plurality of series of value pulses on said drum graduated at different spacings corresponding to different unit prices, means for counting said pulses, means controlled by said marker pulse for initiating the counting of graduations from said weight track and from a selected one of said value tracks, means controlled by said recorded position for terminating said counting operation, and means for producing a record of said respective counts indicating the weight and value of the article.

13. A computing scale having a lever, weighing mechanism associated therewith, an arm connected to said lever and adapted to be deflected through an angle corresponding to the weight of the article, a continuously rotating counter drum, means rotatable with said drum and traversing a path adjacent that of said arm for sensing the angular position occupied by said arm, means responsive to the arrival of said lever at a balanced condition in a weighing operation, a recording track on said counter drum, means controlled by said responsive means for recording the angular position of said arm on said track, a marker pulse occupying another track of said drum and identifying a datum line position, a series of graduated pulses occupying a weight reading track of said drum and spaced in accordance with small increments of weight, a plurality of series of value pulses on said drum graduated at different spacings corresponding to different unit prices, means for counting said pulses, means controlled by said marker pulse for initiating the counting of graduations from said weight track and from a selected one of said value tracks, means controlled by said recorded position for terminating said counting operation, means for producing a record of said respective counts indicating the weight and value of the article, and means for erasing the position recorded on said recording track in preparation for a subsequent weighing operation.

14. A computing scale having a lever, weighing mechanism associated therewith, an arm connected to said lever and adapted to be deflected through an angle corresponding to the weight of the article, a continuously rotating counter drum, means rotatable with said drum and traversing a path adjacent that of said arm for sensing the angular position occupied by said arm, means responsive to the arrival of said lever at a balanced condition in a weighing operation, a memory track on said counter drum, means controlled by said responsive means for magnetically recording the angular position of said arm on said memory track after said lever has come to a balanced condition, a series of graduated weight pulses on said drum and spaced in accordance with small increments of weight, a plurality of series of value pulses on said drum graduated at different spacings corresponding to different unit prices, means for counting pulses from said weight series and from a selected one of said value series over an arc corresponding to the angle of deflection of said arm, and means for selecting a different one of said value series of pulses to provide a value count at a different unit price.

15. A computing scale having a lever, weighing mechanism associated therewith, an arm connected to said lever and adapted to be deflected through an angle corresponding to the weight of the article, a continuously rotating counter drum, means rotatable with said drum and traversing a path adjacent that of said arm for sensing the angular position occupied by said arm, means responsive to the arrival of said lever at a balanced condition in a weighing operation, a memory track on said counter drum, means controlled by said responsive means for magnetically recording the angular position of said arm on said memory track after said lever has come to a balanced condition, a series of graduated weight pulses on said drum and spaced in accordance with small increments of weight, a plurality of series of value pulses on said drum graduated at different spacings corresponding to different unit prices, means for counting pulses from said weight series and from a selected one of said value series over an arc corresponding to the angle of deflection of said arm, means for selecting a different one of said value series of pulses to provide a value count at a different unit price, and means for producing a record of said respective counts indicating the weight and value of the article.

16. A computing scale having a load receiving platter, a lever, a weighing mechanism associated therewith, an element adapted to be deflected through an angle varying in direct relation to the deflection of said lever, a continuously rotating counter drum, means operable for recording a pulse on a memory track of said drum at an angular position corresponding to the deflected position of said element, means on said drum establishing a datum line position, counting means associated with said drum for counting weight graduations at a predetermined rate, means controlled by said drum for initiating the action of said counter at said datum line position and terminating said action at said recorded position to produce a count representing the weight of the article, and means for preventing a repeat operation of said recording means until the article being weighed has been removed and another article placed on the scale.

References Cited in the file of this patent

UNITED STATES PATENTS

| | | |
|---|---|---|
| 1,629,221 | MacNutt | May 17, 1927 |
| 2,575,342 | Gridley | Nov. 20, 1951 |
| 2,597,866 | Gridley | May 27, 1952 |
| 2,617,705 | Coombs | Nov. 11, 1952 |
| 2,623,936 | Kennedy | Dec. 30, 1952 |
| 2,680,241 | Gridley | June 1, 1954 |
| 2,730,698 | Daniels | Jan. 10, 1956 |
| 2,734,188 | Jacobs | Feb. 7, 1956 |
| 2,740,952 | Jacobs | Apr. 3, 1956 |
| 2,803,448 | Biebel | Aug. 20, 1957 |

FOREIGN PATENTS

| | | |
|---|---|---|
| 595,871 | Germany | Apr. 23, 1934 |

OTHER REFERENCES

"ERA Shaft-Position Analog-to-Digital Converter," Transactions of the IRE Professional Group on Instrumentation, pages 55–60, June 1953.

UNITED STATES PATENT OFFICE
CERTIFICATE OF CORRECTION

Patent No. 2,860,867 November 18, 1958

Kenneth C. Allen et al.

It is hereby certified that error appears in the printed specification of the above numbered patent requiring correction and that the said Letters Patent should read as corrected below.

Column 6, lines 63 and 64, for "recorded" read -- recording --; column 7, line 26, for "comprising" read -- computing --.

Signed and sealed this 24th day of March 1959.

(SEAL)
Attest:

KARL H. AXLINE
Attesting Officer

ROBERT C. WATSON
Commissioner of Patents